Jan. 28, 1964 D. M. VESPER 3,119,993

DEAD TIME SYSTEM FOR ANALOG COMPUTER

Filed Oct. 30, 1958 11 Sheets-Sheet 1

INVENTOR.
D. M. VESPER

BY Hudson & Young

ATTORNEYS

INVENTOR.
D. M. VESPER
BY *Hudson & Young*
ATTORNEYS

INVENTOR.
D.M. VESPER
BY Hudson & Young
ATTORNEYS

INVENTOR.
D. M. VESPER
BY Hudson + Young
ATTORNEYS

READER SIGNAL-1 CPS SINE WAVE
20 PPS READ RATE

INPUT HOLD CIRCUIT SIGNAL

INTEGRATOR HOLD
CIRCUIT SIGNAL

INVENTOR.
D. M. VESPER

BY Hudson & Young

ATTORNEYS

DEAD TIME SYSTEM FOR ANALOG COMPUTER

Filed Oct. 30, 1958

INVENTOR.
D. M. VESPER
BY Hudson & Young
ATTORNEYS

INVENTOR.
D. M. VESPER

BY Hudson & Young
ATTORNEYS

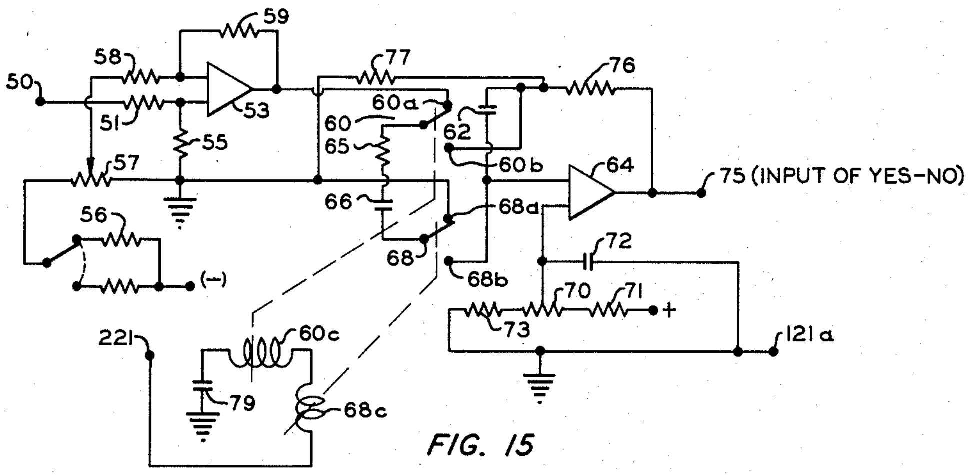
FIG. 15
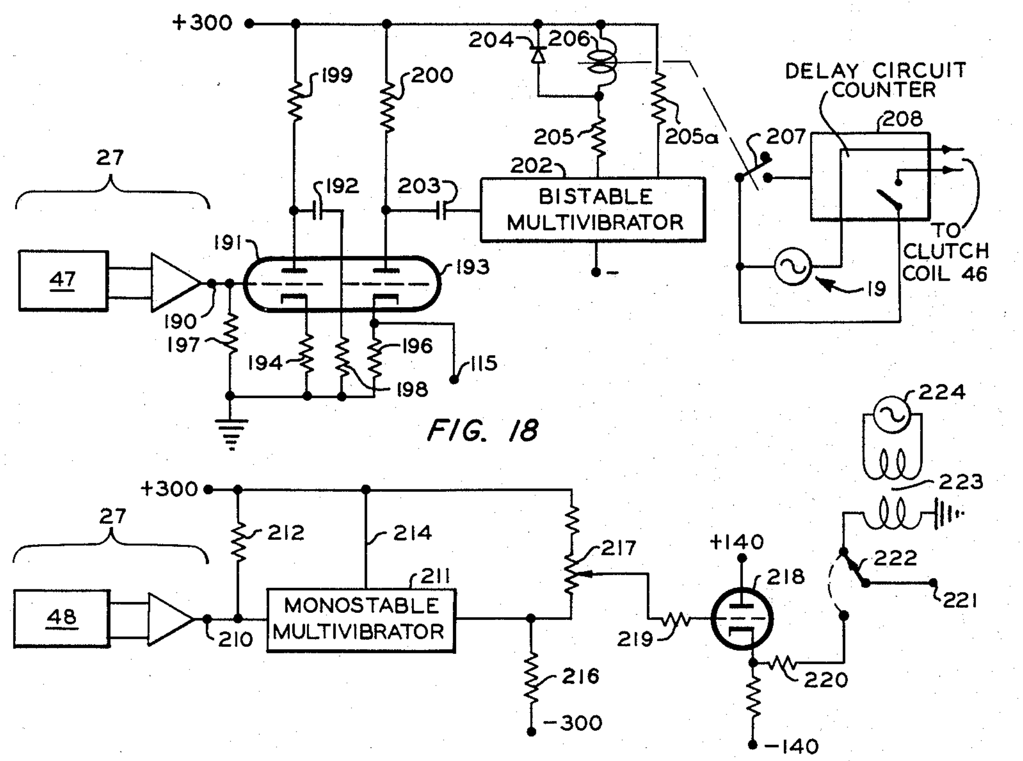
FIG. 18
FIG. 19
INVENTOR.
D.M. VESPER
BY Hudson & Young
ATTORNEYS INVENTOR.
D. M. VESPER
BY Hudson & Young
ATTORNEYS

INVENTOR.
D.M. VESPER

BY Hudson & Young

ATTORNEYS

INVENTOR.
D.M. VESPER
BY Hudson & Young
ATTORNEYS

United States Patent Office 3,119,993
Patented Jan. 28, 1964

3,119,993

DEAD TIME SYSTEM FOR ANALOG COMPUTER

Daniel M. Vesper, Bartlesville, Okla., assignor to Phillips Petroleum Company, a corporation of Delaware Filed Oct. 30, 1958, Ser. No. 770,730
8 Claims. (Cl. 340—347)

This invention relates to a method and apparatus for introducing a delay into analog signals which continuously appear in a system. In one specific aspect, it relates to employing a punched tape as a means of introducing time delay into analog signals.

In various computing problems, such as analysis of instrument systems, process analysis, and many others, it is desired to introduce a time delay into certain analog signals while they are continuously applied to or appear in the system under study. In instrument system studies this delay is termed dead time. The purpose of this invention is to provide a means of introducing a desired or predetermined amount of time delay or dead time into an analog signal. In the past this has been accomplished by magnetic tape delay systems, by photosynthesis systems and the like. The instant system provides a means of digitalizing and analog signal, punching the digital information on tape in bit form, storing the tape for a predetermined time, removing the tape from storage, reading out the bits stored thereon, and converting them back to analog form.

In converting from analog to digital form the apparatus chops out a measured time portion of the analog signal and stores it on a condenser. This stored signal is a discrete value which is then applied to a series of yes-no circuits to break it down to bits of predetermined size, which equal the discrete value when summed. Each of the yes-no circuits determines if the input signal thereto is equal to or greater than a certain fixed voltage, e.g., 50 volts. If the signal is less than, say 50 volts (i.e., the determination is "no"), it is merely passed through the yes-no circuit to the next circuit where the same determination is made for a lower voltage. However, if the signal is greater than 50 volts (i.e., the determination is "yes"), a multivibrator is triggered and applies a signal to a punching circuit. It will also subtract 50 volts from the input signal before applying it to the next succeeding stage. The decision-making is repeated in each stage until the remainder is zero or negligible. In one embodiment, an eight-channel computer is used, i.e., eight yes-no circuits are employed. When a signal has passed through all eight of the yes-no circuits, a timing pulse is applied to simultaneously prepare them to punch the tape for all channels which have read "yes" from the information supplied. Mechanical means then carry out the requisite punching operation. Each circuit or channel thus punches a bit representative of a predetermined value.

After the tape has been punched it is sent to storage for a predetermined time. After being removed from storage the bits are read off the tape by electrical means and are converted through appropriate circuitry to analog form once again. The delay is introduced by storing the tape for a predetermined time. If desired, of course, the digital to analog converter can be used separately from the analog to digital converter and vice versa.

The objects of this invention are as follows: To provide apparatus for introducing a predetermined delay in continuously applied analog signals for computing purposes; and to provide means for accomplishing this by storing digitalized analog signals on punched tape and removing the signals therefrom and converting them back to analog form. Other objects and advantages will become apparent from the following description and the appended drawings.

Figure 1:
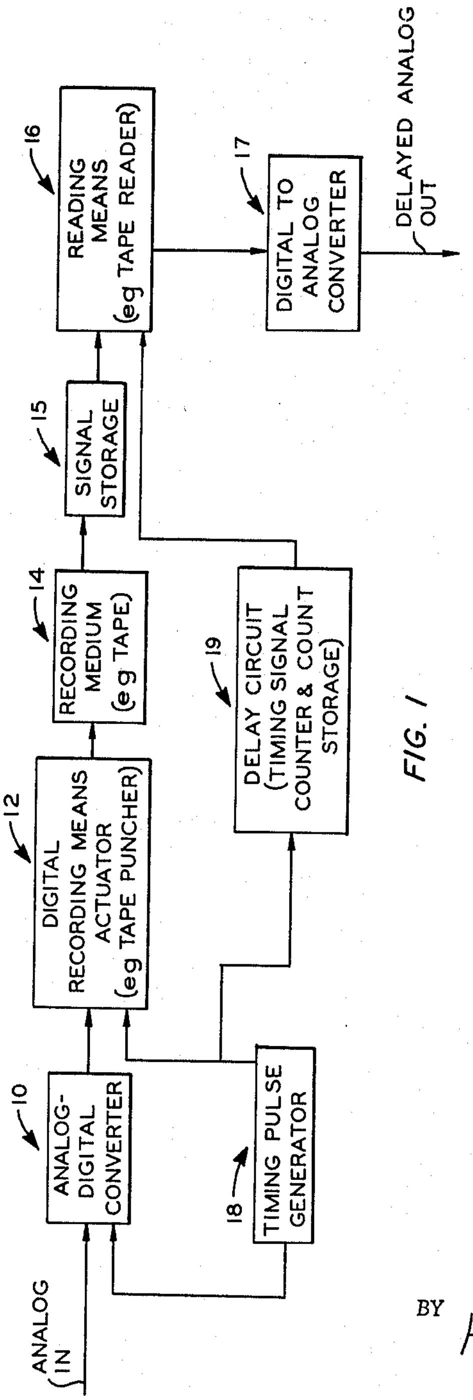
FIGURE 1 shows schematically the overall system for introducing a delay into an analog signal.
Figure 2:
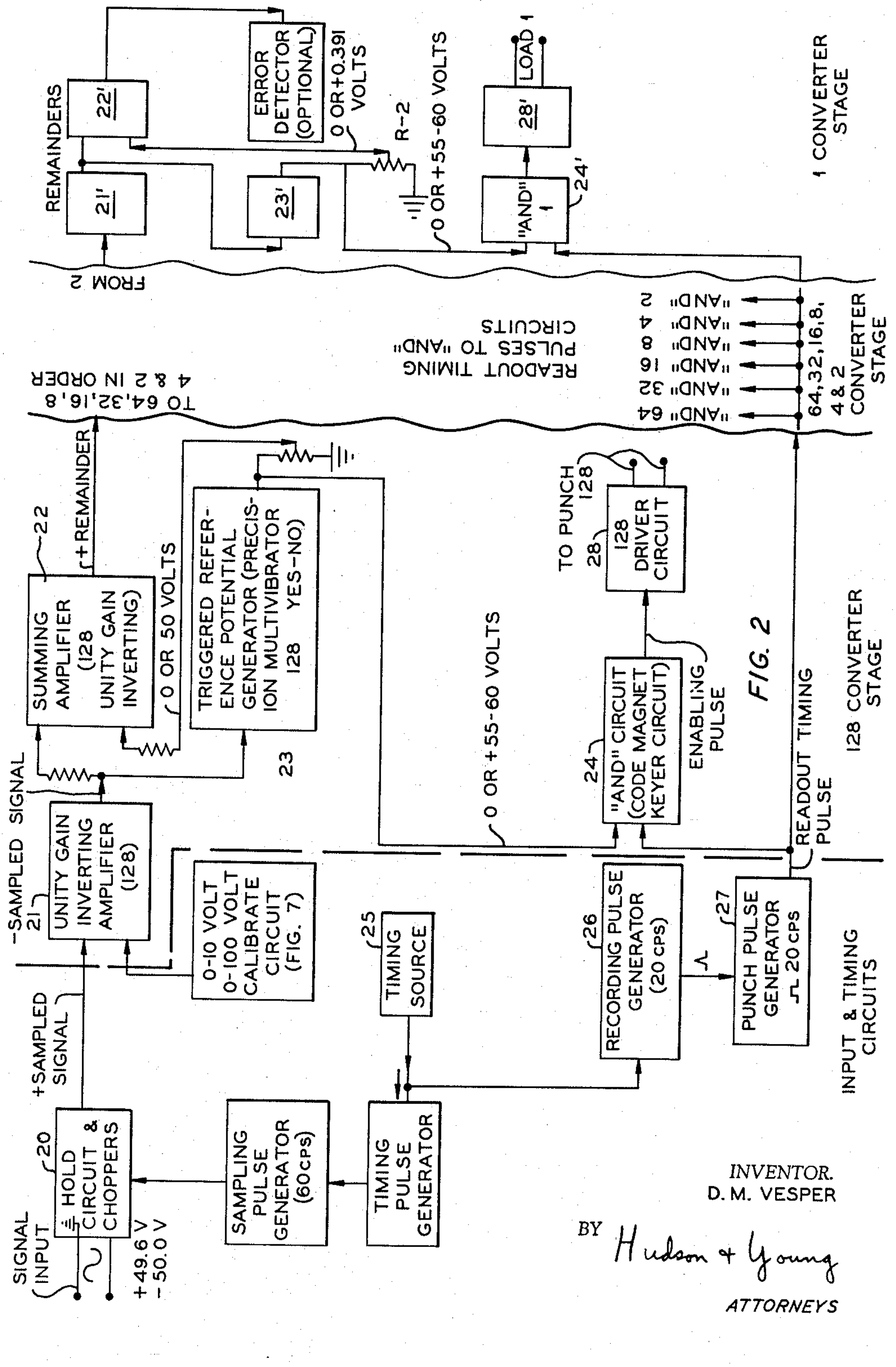
FIGURE 2 shows schematically the apparatus for converting an analog signal to digital form for purposes of storing on a punched tape.
Figure 3:
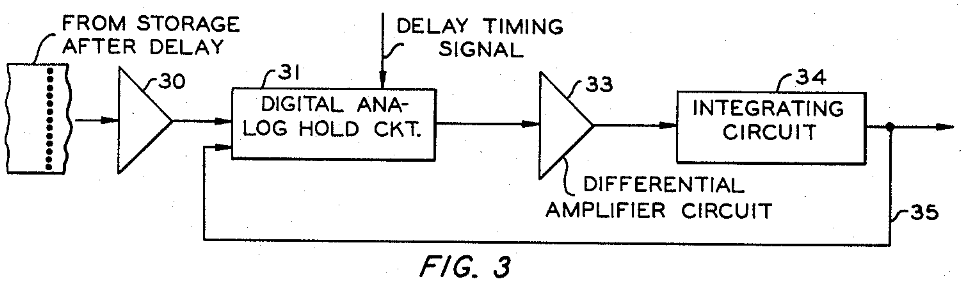
FIGURE 3 shows schematically the apparatus for converting bits stored on the tape to analog form.
Figure 7:
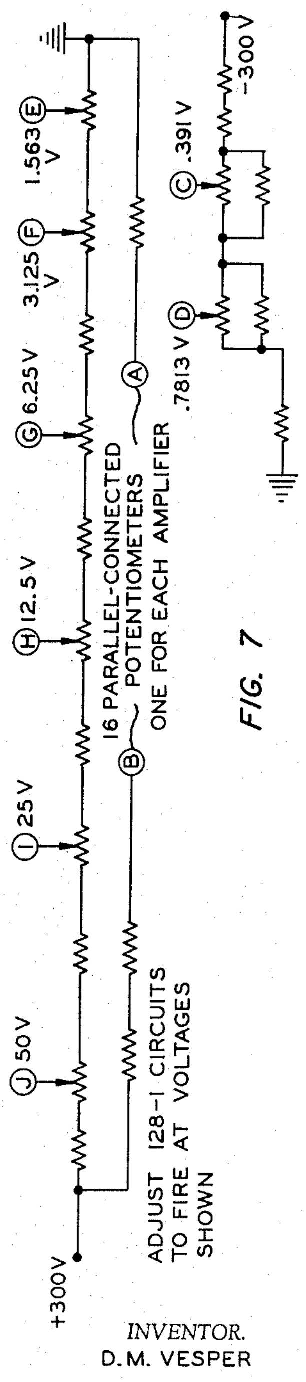
Figure 13A:
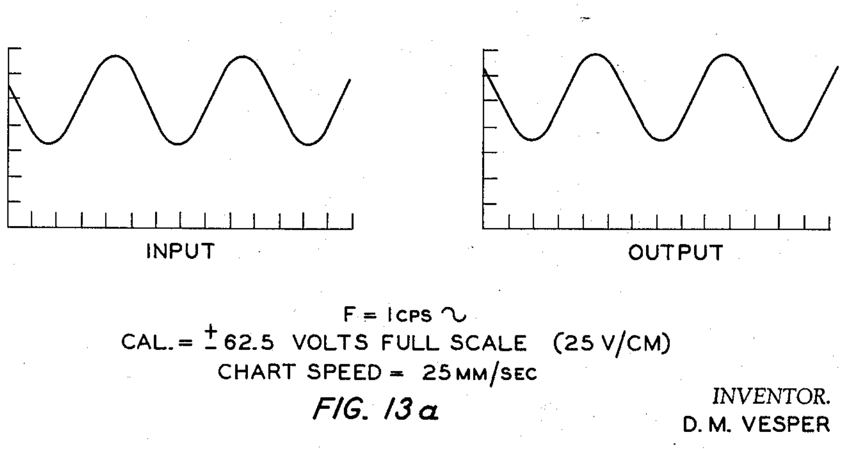
Figure 13B:
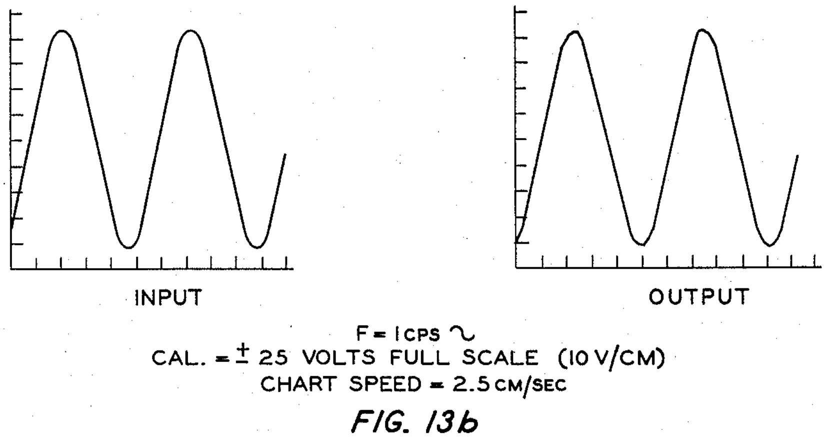
Figure 14:
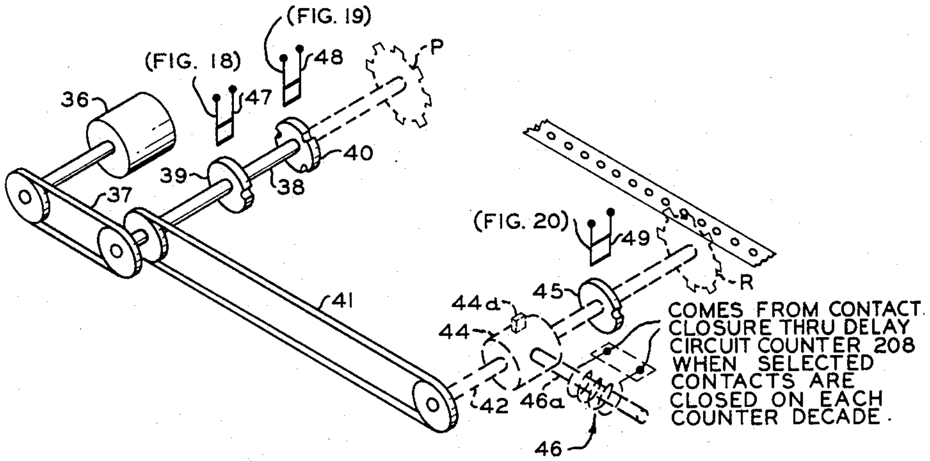
Figure 16:
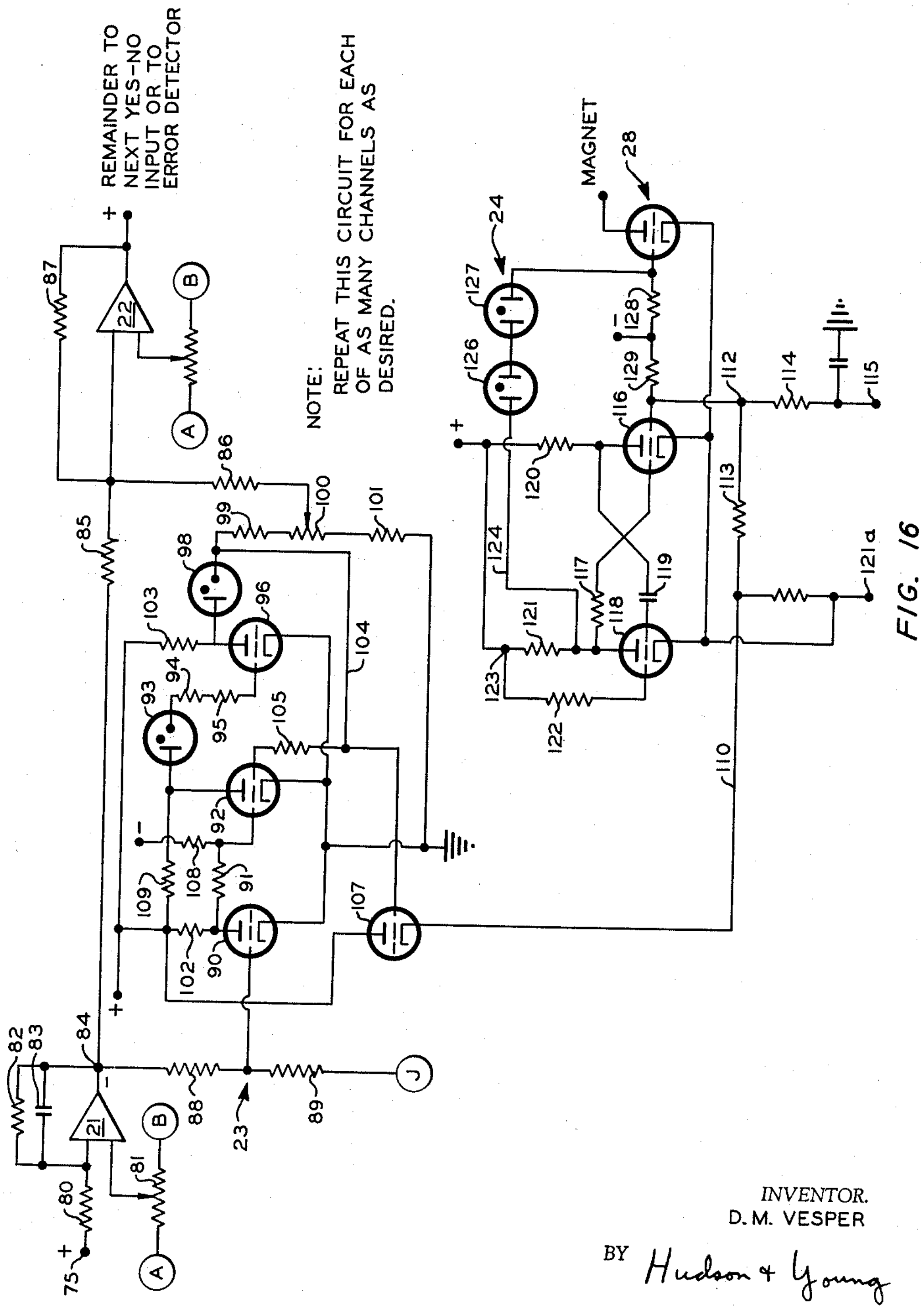
Figure 17:
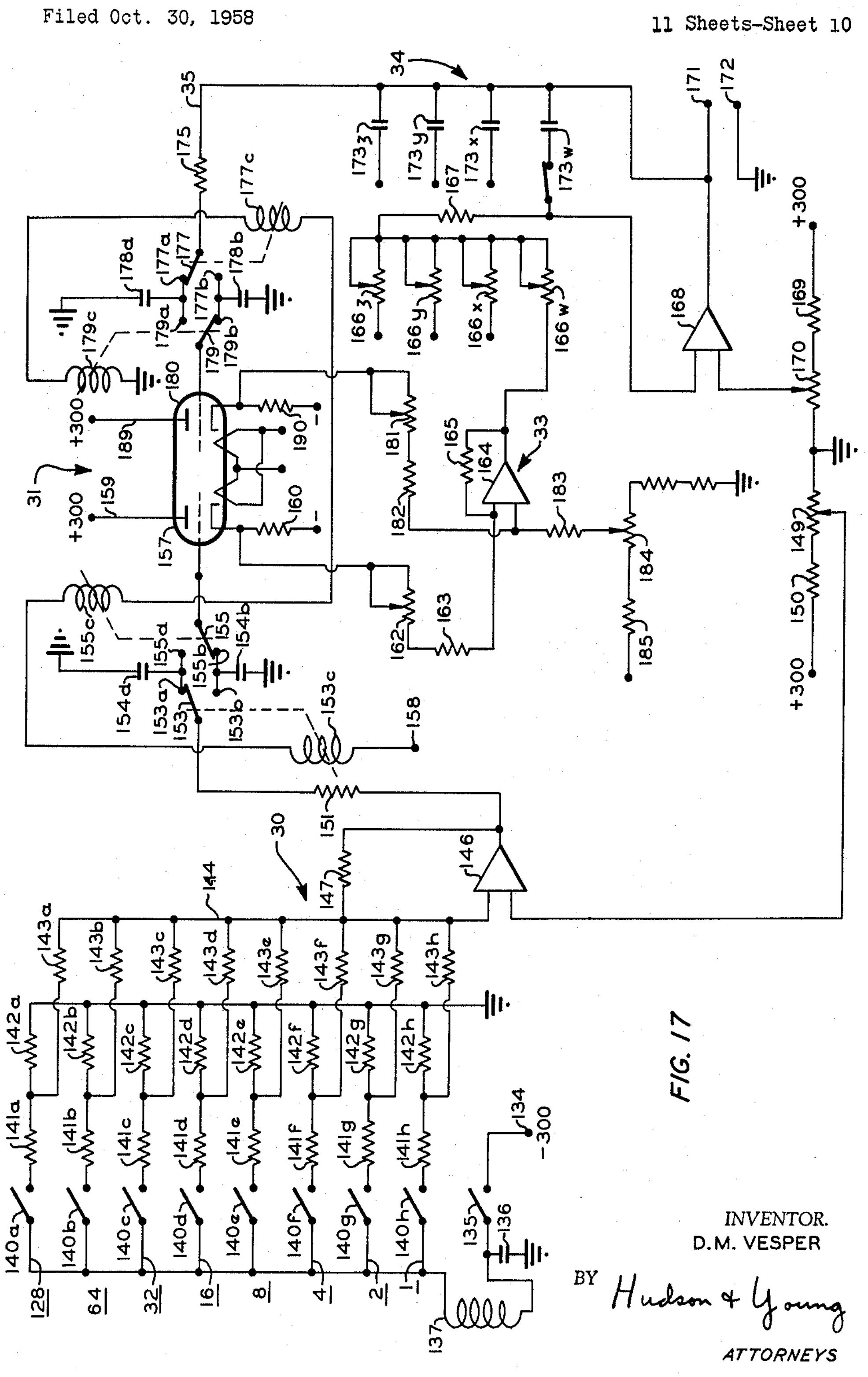
Figure 20:
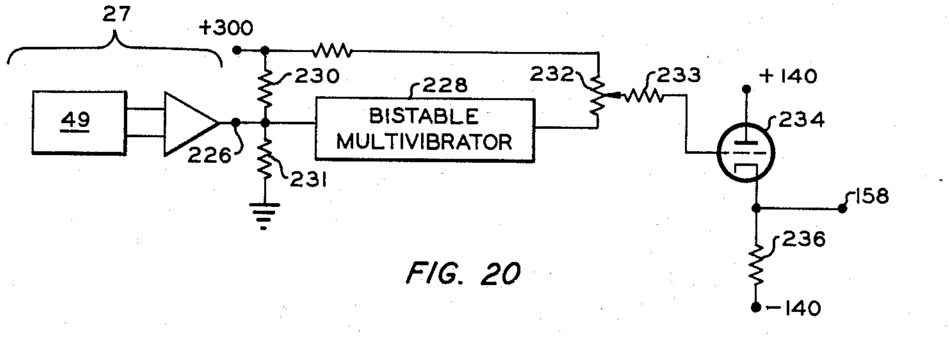
Figure 21:
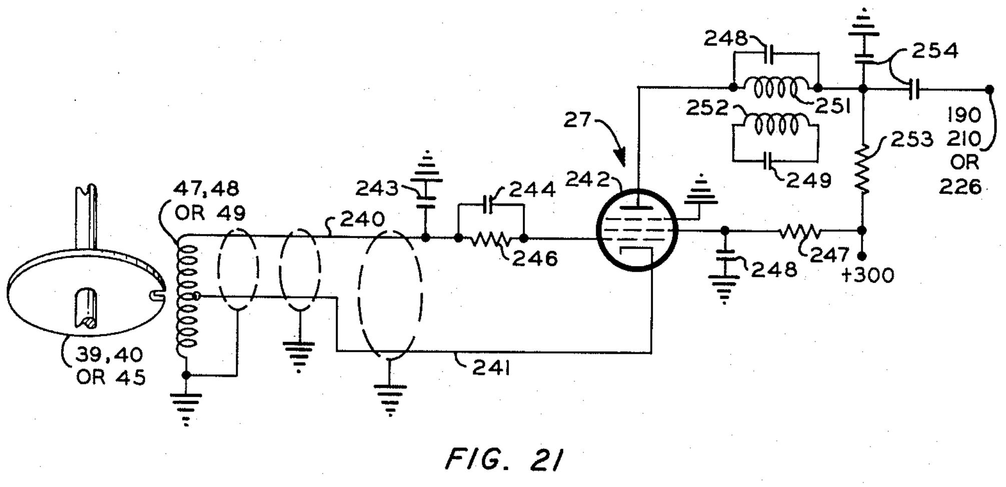

FIGURES 4, 5, 6, 8, 9, 10, 11, and 12 show examples of signals appearing at various points in the apparatus of FIGURES 1, 2 and 3;

FIGURE 7 illustrates the biasing means for the respective yes-no circuits of FIGURE 16;

FIGURE 13 shows actual signals treated by the instant apparatus;

FIGURE 14 shows the timing signal generator;

FIGURE 15 shows the apparatus for converting from an analog to a stair-stepped signal;

FIGURE 16 shows the yes-no circuit and the "and" circuit for converting a stair-step signal into information to be punched on the tape;

FIGURE 17 shows means for converting information stored on a punch tape to analog form;

FIGURES 18, 19, and 20 show electrical apparatus for converting the pulses generated by the apparatus of FIGURE 14 to square wave form; and FIGURE 21 shows the arrangement of pick-up and oscillator which is common to FIGURES 18 through 20.

Referring now to FIGURE 1, there is shown the overall arrangement of apparatus for achieving a time delay in an analog signal. The analog signal is applied to an input terminal of an analog to digital converter 10. The digitalized signal is applied from 10 to a recording means actuator 12—in this case multiple channel tape punching device such as the motorized tape punch manufactured by the Commercial Controls Corporation, Model 2, and as described in their catalogue No. SP-8590R2. These digitalized bits are then applied from 12 to a recording medium 14, such as a punched tape which is then stored in storage apparatus 15 (e.g. a container into which the punched tape is fed and where it remains for a predetermined period of time—namely, that time period equal to the delay desired to be introduced into the analog signal). The punched tape is, after the end of the delay time, removed from storage 15 and applied to a reading means, e.g., a tape reader 16, then to a digital to analog converter 17 where the bits stored on the tape are converted back to analog and provided to the output terminals as an analog signal.

The timing signal generator 18 applies timing signals to the converter 10, the recording means 12, and to the delay circuit 19. The latter, after the determined or preset time delay sends out a timing signal to the reading means to thereby remove the signal from storage 15 and cause the analog signal to be reproduced after the desired time. The reading means 16 may be a commercially available multiple channel (here 8 channels) motorized tape reader such as that manufactured by the Commercial Controls Corporation, of Rochester, New York, and as described in their catalogue No. SP-8602R2.

Before going further it is necessary to define certain terminology which will be used hereinafter. In accordance with binary language, certain of the computer circuits in the converters 10 and 16 are referred to as 128, 64, 32, 16, 8, 4, 2, and 1, respectively. Each of these circuits in the analog to digital converter 10 is biased to fire and to prepare a punch for mechanical movement if a signal applied thereto is greater than 50 volts, 25, 12½, 6.25, 3.125, 1.563, .7813, and .391 volts, respectively. Observe that the voltage in each successive circuit is one-half that of the preceding one. The apparatus for biasing the respective circuits is shown in FIGURE 7. Signals are applied to the respective channels in the analog to digital converter 10 in the order in which they are named above—that is, from the 128 circuit (50 volt) down to the 1 circuit (.391 volt) circuits. Delay time refers to that interval of time by which an analog signal is delayed; it may be an arbitrarily selected period, or it may be one rationally determined from the system being studied. Dead time, as applied to instrument or process systems is that period of time between the initial measurement of a process stream for purposes of correcting a process variable and the next subsequent measurement of that part of the process stream which has been subjected to the corrected process variable. A "yes-no" circuit is one that decides if a signal is equal to or larger than a selected value and responds to the decision in a prescribed manner. An "and" circuit is one that is rendered operative by the occurrence thereat of two events (or signals). An analog to digital converter is just what its name implies—a device employed to convert analog signals to digital form, specifically to a series of discrete signals (or values) which represents a series of amplitudes of the original analog. Each discrete signal comprises a plurality of digital bits each of which in turn represents a signal of a certain amplitude. A digital to analog converter is a device for doing just the opposite converting digital bits to an analog signal. A "tape puncher" is a device for punching digital bits on tape. A tape reader is a device for reading digital bits as they appear on tape. Both the tape puncher and reader have means for passing tape therethrough. A "stairstep" or "stairstepped signal" is an analog signal which has been converted to a series of discrete values (see FIGURES 5, 6).

Figure 4:
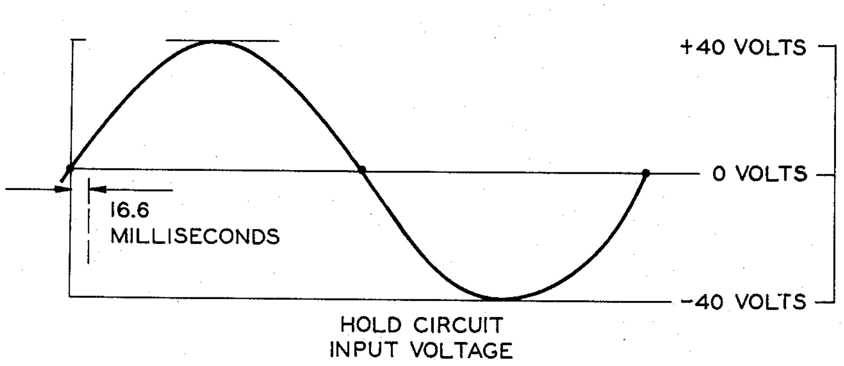
Figure 5:
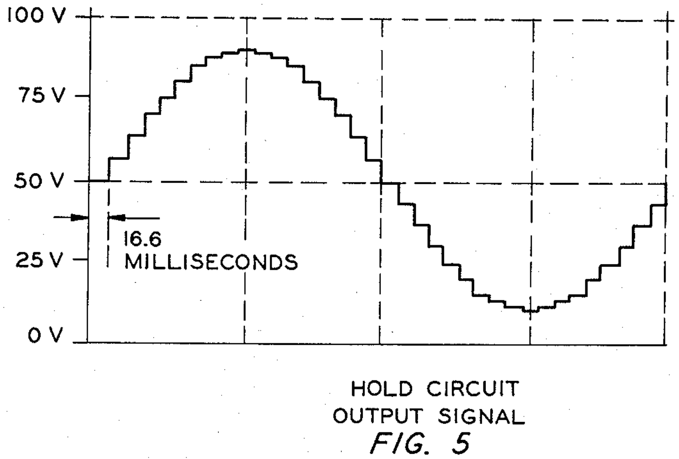

The function of the analog to digital converter will now be described by referring to FIGURES 2 and 4 through 6. An analog signal which it is desired to delay and for example of the form in FIGURE 4 is applied to the hold circuit 20 of FIGURE 2. The hold circuit converts this to a single polarity (here always plus) stair-step form such as shown in FIGURE 5 by chopping and storing the chopped portions of the analog signal on condensers, as described with respect to FIGURE 15 below. This is then applied to the unity gain inverting amplifier 21 which thus always provides a negative signal at its output terminal. This signal is applied to one terminal of a summing amplifier 22. The signal is also applied to a yes-no circuit 23 where, if it is greater than 50 volts (for the 128 circuit) it triggers the circuit and provides an output signal of +50 volts to the summing amplifier where a subtraction of 50 volts and another inversion takes place. The signal is now of its original polarity but 50 volts smaller than the signal applied to the amplifier 21. If the output of 21 is not greater than 50 volts it fails to trigger the yes-no circuit and summing amplifier 22 merely inverts the signal and applies it to the next succeeding yes-no circuit (64). If the yes-no circuit is triggered a signal is also provided to the "and" circuit 24 which prepares it for operating the punch mechanism. The same operation is repeated in succession on the remainder of the stair-step of FIGURE 5 so that by the time one stair-step has been acted on by each of the 8 channels, 128 through 1, it has actuated an appropriate number of yes-no circuits 23 and prepared various punches. This is shown in detail in FIGURE 6 where the output signal from the 128 circuit is applied to the 64 circuit. The purpose of actuating various channels, of course, is to provide a plurality of bits which added together equal the voltage represented by each stair-step of FIGURE 6 by preparing appropriate channel punches for punching. The 1 channel is shown schematically in FIGURE 2 with primed numbers, representing the corresponding parts of the 128 circuit. Intervening circuits, of course, are constructed in like manner.

When one stair-step has been completely treated by the respective circuits 128 through 1, the timing source 25 generates a pulse in the recording pulse generator 26 which is converted to a square pulse of uniform time length in the punch pulse generator 27. The output from 27 is applied to the "and" circuit 24, and when it coincides with a signal provided thereto by the yes-no circuit 23, an enabling pulse is transmitted by 24 to the punch driver circuit 28. The "and" circuits for 128 through 1 are all energized simultaneously by the output signal from 27. When this happens all channels are simultaneously prepared for punching to thus place a bit on the tape which is representative of the analog at a given time. The term "prepared for punching" is used because the tape puncher mechanism itself performs this act on channels which have answered "yes" to the applied stairstep.

Figure 8:
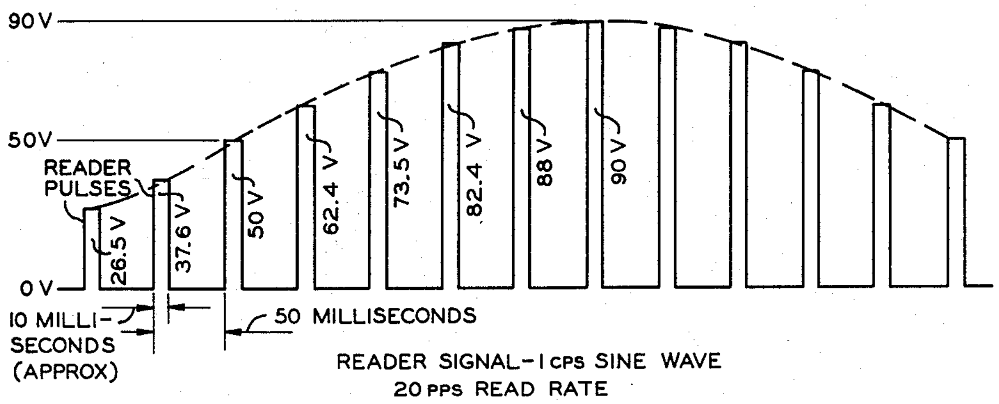
Figure 9:
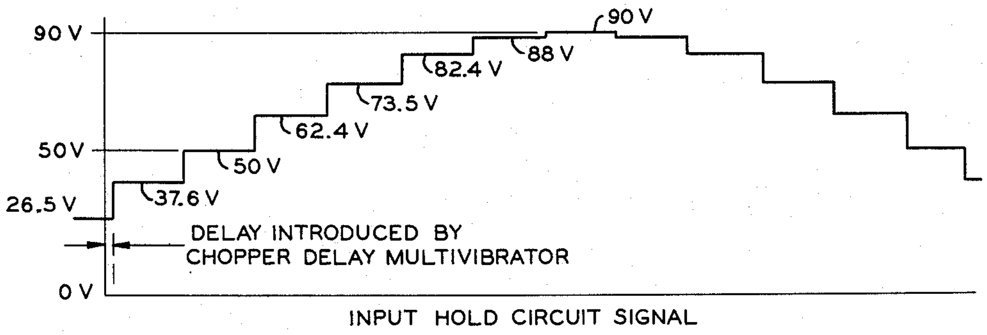
Figure 10:
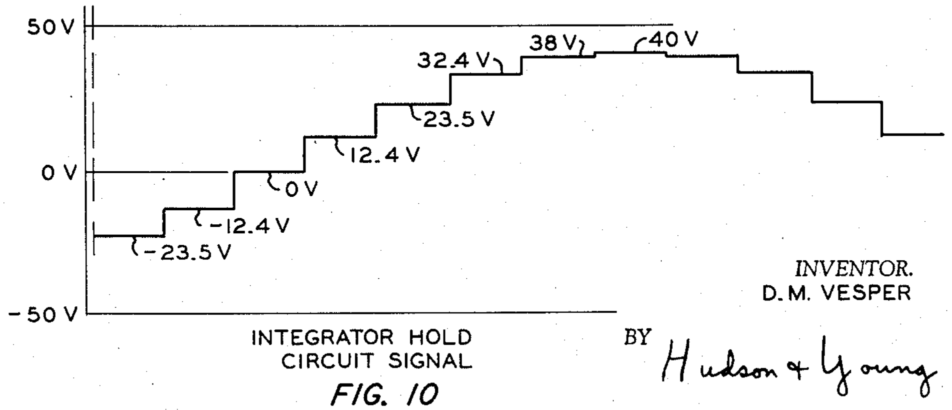
Figure 11:
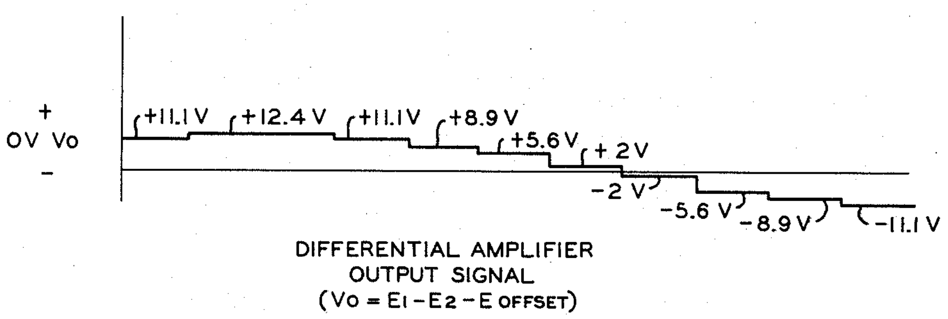
Figure 12:
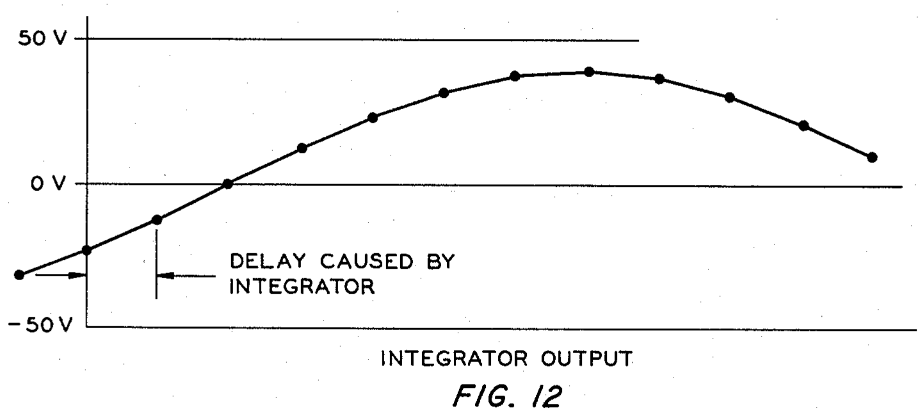

Once the tape is punched it is sent to storage 15 where is remains until removed therefrom after a predetermined time interval. The tape is applied as an input signal means to the tape reader 16 and digital to analog converter 17 which are shown schematically in FIGURE 3 where the bits from the tape are applied to summing amplifier 30 which adds them together to provide a series of output pulses such as shown in FIGURE 8. These pulses are then applied to a digital to analog hold circuit 31 where they are converted to the stair-step form of FIGURE 9. The stair-steps are then differentially amplified by comparison with a feed back voltage in differential amplifier unit 33, the output of which is applied to an integrating circuit 34. The feedback circuit 35 connects from the integrator output to one terminal of the hold circuit 31. An analog output is obtained at the output terminal of the integrating circuit 34. The output of the differential unit 33 is represented in FIGURE 11, while the integrater output is represented in FIGURE 12.

Turning now to FIGURE 14 there is shown the timing signal generator. Timing is done mechanically by using a synchronous motor 36 to drive the mechanism through a timing belt 37. The latter rotates a shaft 38 having thereon the timing wheels 39 and 40. Another belt drive 41 connects the shaft 38 to another shaft 42 having thereon a clutch 44 and another timing wheel 45. The clutch 44 has an actuating means 46 disposed adjacent thereto, and both 44 and 46 are part of the tape puncher such as 12 of FIGURE 1. A member *44a* of the clutch engages the part *46a* of means 46. Upon actuation of 46, part *46a* moves away from the clutch and this causes wheel 45 to begin turning with shaft 42. The dotted lines of this figure represent that which is old. The gears P and R are representative only of the mechanisms for punching and reading the tape, respectively.

Each of the timing wheels 39, 40 and 45 have notches in them and are disposed adjacent pick-up members 47, 48, and 49, respectively. The signal generator produces signals by the rotation of respective timing wheels. When a notch in one of the wheels goes past one of the respective pick-ups 47–49, a signal is generated which is sent into a circuit such as described in FIGURES 18 through 21. The latter circuits then shape the signal and apply it to appropriate names to cause actuating either hold circuits, the punch apparatus, or the delay circuit, as the case may be.

In FIGURE 15 are shown the details of the hold circuit 20 of FIGURE 2. The purpose of this circuit is to convert a signal such as that of FIGURE 4 to the single polarity (plus) stair-step form of FIGURE 5. An input terminal 50 is connected by resistor 51 to a phase inverting amplifier 53. This terminal is also connected to ground by resistor 55. A negative bias is applied to the other input terminal of the amplifier through resistor 56, potentiometer 57, and another resistor 58 all connected in series. A feedback circuit through the resistor 59 connects one output terminal to the latter input terminal. The last-said output terminal is connected to one contact 60A of a chopper 60. The other contact 60B is connected to a capacitor 62 then to a first input terminal of the phase reversing amplifier 64. The chopper contactor is connected in series through resistor 65 and capacitor 66 to the contactor of chopper 68.

The first contact 68a of the latter is connected to ground while the other contact 68b of the chopper is connected to the first input terminal of amplifier 64. A second input terminal of the amplifier 64 is connected to a source of positive potential through a potentiometer 70 and a resistor 71. A capacitor 72 connects this terminal to a common ground with the And circuit 24. A resistor 73 connects the other end of potentiometer 70 to ground. The output from the amplifier 64 appears at a terminal 75 from whence it is first applied to the 128 (yes-no) circuit which will be described in further detail hereinafter with respect to FIGURE 16. A feedback through resistor 76 to the first input terminal of the amplifier is provided. A resistor 77 returns the hold circuit input to ground. The resistors 76, 77 are matched. The choppers 60 and 68 are operated by their respective coils 60c and 68c which are series connected between the output of the circuit of FIGURE 19 and the ground, having a capacitor 79 isolating them from ground. This arrangement permits the choppers to operate in synchronism with signals generated in the circuit of FIGURE 18 in response to shaft rotation.

The overall gain of the circuit of FIGURE 15 is unity (from terminal 50 to 75). Amplifier 53 reduces input signals to a size that capacitors 66 and 62 can handle, and also applies the plus 50 volt offset to the input signal. Amplifier 64 corrects the overall hold circuit gain to unity.

FIGURE 16 shows schematically the details of the "yes-no" and And circuits as shown in FIGURE 2. It must be stressed that both amplifiers 21 and 22 are unity gain phase inverting. The amplifier 22 has a summing circuit associated therewith as will be hereinafter explained. The "yes-no" circuit 23 is biased to fire at an appropriate voltage (50–.391 volts) as set forth above. One of these circuits is provided for each of the 128 through 1 circuits, each having its own bias. Likewise, each circuit (128 through 1) has its own And circuit 24. This arrangement provides eight channels and permits punching up to eight channels on the tape. Of course, as many channels as desired may be employed.

Figure 6:
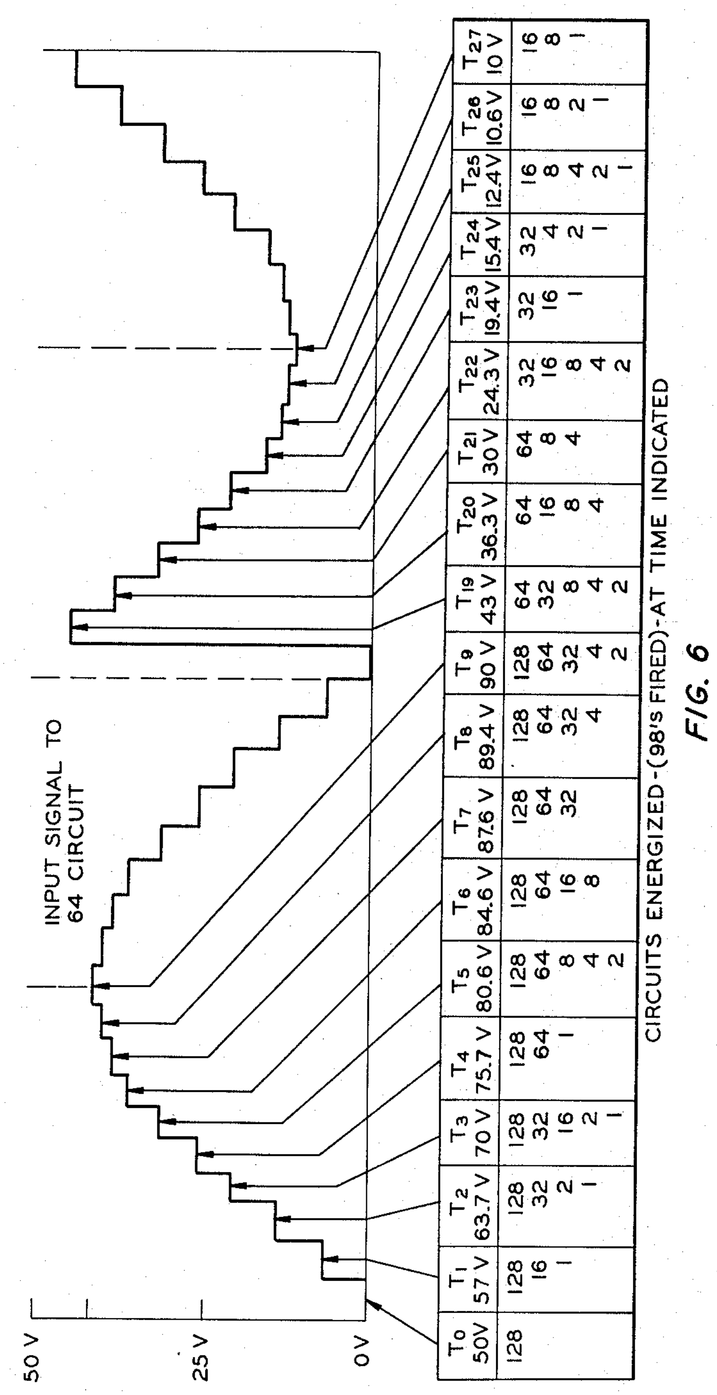

The purpose of the system of FIGURE 16 is to prepare one channel of the tape puncher for punching by deciding if a given input signal is equal to or greater than a preselected voltage. If these conditions do exist, then the circuit also subtracts this voltage from the input voltage so that the next "yes-no" circuit only has to repeat the same operations on the remainder. With each repetition the stair-step signal is broken down into a bit of a specific size as represented by the selected voltages of 50–.391 volts. These various bits are then punched on the tape. FIGURE 6 tabulates which of the various channels are thus prepared, or enabled, responsive to a selected signal.

The stair-step signal from the hold circuit appears at terminal 75. This terminal is connected through a resistor 80 to a first input terminal of the unity gain inverting amplifier 21. The second amplifier terminal is connected to a source of potential AB through potentiometer 81. The AB connections are shown in FIGURE 7. A feedback circuit comprising resistor 82 and capacitor 83 in parallel connects the junction 84 at the amplifier output with its first input terminal. A bias is applied from terminal J across resistor 89 to the yes-no multivibrator circuit. The connection of J is also shown in FIGURE 7. Each of the circuits 128, 64 . . . 1 is provided with a biasing terminal J, I . . . D, C, respectively, as shown in FIGURE 7, discussed below. The signal which appears at junction 84 is applied through a summing circuit comprising matched resistors 85 and 86 to the unity gain inverting summing amplifier 22. The amplifier 22 has a feedback circuit comprising a resistor 87 of magnitude substantially the same as the matched resistors.

The signal which appears at 84 is also applied across resistor 88 to the grid of the triode 90 in the yes-no circuit. The anode of 90 is connected through a resistor 91 to the grid of a second triode 92. The plate of the latter is connected to a voltage regulator 93 which is in turn connected through series resistances 94 and 95 to the control grid of triode 96. The cathodes of triodes 90, 92 and 96 all have a common connection to ground. The plate of triode 96 is connected through a second voltage regulator 98 and a resistor 99 to a potentiometer 100. The contactor of the potentiometer connects to resistor 86 of the aforesaid summing circuit. The other end of the potentiometer is connected to ground through resistor 101. Positive plate voltage is supplied to the triodes 90 and 96 through respective resistors 102 and 103.

A lead 104 connects the voltage regulator 98 to the grid of triode 92 through a resistor 105, and to the grid of a fourth triode 107. Negative grid bias is supplied to triode 92 through resistor 108. The plate of 92 is connected through resistor 109 to the source of positive potential. The anode of 107 is connected to the same source of positive potential at the junction of anode resistors 102 and 109.

A lead 110 connects the output of cathode follower 107 to the And circuit at junction 112 through resistor 113. The punch pulse generator 27 (FIGURE 2) applies timing signals to 112 through terminal 115 and resistor 114. Resistors 113 and 114 make up a summing circuit. The signal from 112 is then applied to what is substantially a one-shot multivibrator circuit. Timing signals are applied to the terminal 115 from the circuit of FIGURE 18.

Junction 112 is connected to the control grid of triode 116 which is in turn coupled through resistor 117 to the plate of a second triode 118. The plate of 116 is coupled through capacitor 119 to the grid of triode 118. Plate voltage is received from a common source through respective resistors 120 and 121. The cathodes of the two triodes are connected to a common ground 121a with the hold circuit. The grid of 118 is connected through resistor 122 to a junction 123 which is common to resistor 121 and the source of positive potential. A lead 124 connects the plate of triode 118 to the series connected glow tubes 126 and 127, thence to the control grid of the driver 28 (FIGURE 2) which comprises another triode. Grid bias voltage is supplied from the source of negative potential to the driver 28 through a resistor 128 and to the multivibrator circuit (grid of 116) through resistor 129.

Coming now to FIGURE 17 there is shown schematically the apparatus for converting from stored signals on the tape, i.e., digital form, to analog. The operations for accomplishing this have been described with respect to FIGURE 3. The above described tape reader has means for passing the tape between the contactor and the contact of a switch. If there is a hole punched in the tape a contact is made and a signal is transmitted into the summing circuit 30. The electrical apparatus for doing this is shown as a source of negative potential 134 which supplies potential to all eight channels through a switch 135 connected in series with grounded capacitor 136 and coil 137 to the various channel switches 140a, 140b . . . 140h, each one of which coincides with one of the eight channels or circuits 128, 64, 32 . . . 1. Each channel has its switch 140 connected in series with a voltage divider comprising resistor 141 and a second resistor 142. All of the resistors 142a through 142h are connected to ground through a common lead. In the preferred embodiment, the resistors 141a . . . 141h are of substantially the same magnitude, but resistors 142a . . . 142h vary. The voltages existing at the junction between respective ones of 141 and 142 are then applied to respective ones of summing resistors, 143a . . . 143h which are connected to a common lead 144 that connects all summing resistors to the summing amplifier 146. The summing amplifier has a feedback to the lead 144 through a resistor 147. A second terminal of the summing amplifier is connected to a source of positive potential through a lead 148 and the series connected potentiometer 149 and resistor 150.

The signal appearing at the output of summing amplifier 146 is of the spaced pulse form such as shown in FIGURE 8. This signal is applied through resistor 151 to the blade of a chopper 153. Contact 153*a* of the chopper is connected to a grounded capacitor 154*a* and contact 155*a* of a chopper 155. Similarly, the other contact 153*b* of the chopper is connected to the grounded capacitor 154*b* and the second contact 155*b* of the chopper 155 the blade of which is connected to the grid of cathode follower 157. Series connected coils 153*c* and 155*c* operate the choppers and are connected by terminal 158 to a source of chopper actuating signals, viz. the circuit of FIGURE 20.

Positive plate voltage is provided to the cathode follower 157 through the lead 159, and negative bias is provided to the cathode through resistor 160. The output from 157 is applied across adjustable resistor 162 and fixed resistor 163 to a first input of the differential amplifier 164 in the unit 33. A feedback from the output of the amplifier through resistor 165 is included in 33. The output of 33 is also provided across one of a plurality of variable resistors 166, in the embodiment shown as 166*w* through 166*z*, and a resistor 167 to the input of an amplifier 168 in the integrating circuit 34. Positive potential is applied to this amplifier across a fixed resistor 169 in series with a potentiometer 170. Across output terminals 171 and 172 appear an integrator signal, namely the converted signal such as that shown in FIGURE 12. The feedback circuit 35 (see FIGURE 3) includes one of a group of capacitors 173 (here the capacitor 173*w*) which is matched with the respective resistor 166 (166*w*) to provide a circuit of proper time constant dependent on the tape reader shaft speed (code reading speed).

The feedback circuit 35 (FIGURE 3) connects to another hold circuit shown in FIGURE 17 through a resistor 175 being connected to a chopper 177 having an upper contact 177*a* connected to a grounded capacitor 178*a* and to a contact 179*a* of the contactor 179. Similarly, the contact 177*b* is connected to a grounded capacitor 178*b* and to the contact 179*b*. The respective choppers are actuated from coils 177*c* and 179*c* which are series connected with 153*c* and 155*c*. This means that all four choppers work simultaneously to aid in providing the differential step signal of FIGURE 11, which is ultimately integrated to provide sloped portions of FIGURE 12.

The signal from chopper 179 is applied to the grid of a cathode follower 180 which transmits its output signal through adjustable resistor 181 and resistor 182 to a second input terminal of the amplifier 164. This second input terminal is also connected by resistor 183, potentiometer 184 and fixed resistor 185 to a source of positive potential. The other end of 184 is connected across a resistor circuit to ground. Plate voltage is applied to cathode follower 180 through a lead 189 and the cathode is biased from a source of negative potential by resistor 190.

Timing signals are supplied to the And circuit 24 (FIGURES 2 and 14), and to hold circuits 20 (FIGURES 2 and 15) and 31 (FIGURE 17), respectively, by the circuits of FIGURES 18, 19 and 20. These have signal pickups 27 of a common design as shown in FIGURE 21.

The timing signals to the punch keyer circuit (And circuit 24) are provided through the apparatus of FIGURE 18. The pickup assembly 27 supplies pulses to a terminal 190, thence to the control grid of a triode 191. The plate of the triode is connected through a capacitor 192 to the grid of a cathode follower 193, the cathode of the latter is connected to a terminal 115 (see FIGURE 16). The cathodes of 191 and 193 are connected to ground by respective resistors 194 and 196, their grids are connected to the ground through resistors 197 and 198 and positive plate voltage is supplied to the two through respective resistors 199 and 200. The signal from the plate of 193 is applied to the input of a bistable multivibrator 202 through a capacitor 203. The internal arrangement and operation of 202 is described in "Wave Forms," by Chance et al., first edition, published in 1949 by McGraw-Hill, on page 164, and is shown in FIGURE 5.4. The plate potential circuit of this apparatus has been modified from that shown in "Wave Forms" for the left hand tube by connecting a parallel circuit comprising rectifier 204 and coil 206 in series with the plate resistor 205. The plate resistor of the right tube for the "Wave Forms" circuit is shown as 205*a*.

The coil 206 serves to operate the delay circuit counter 208 (FIGURE 18) through a switch 207. This counter is the device that is used to set the delay on the instrument so that a predetermined amount of delay may be introduced into the analog signal. It operates by counting the number of pulses supplied to it and, after a predetermined number of pulses has occurred, it sets in motion the digital to analog circuit by energizing the coil of a clutch 46 (FIGURE 14). Such a counter is made by Veeder-Root Incorporated, Hartford, Connecticut. It is described in U.S. Patents 2,311,884; 2,342,325; 2,372,-650; and 2,540,808. This mechanism is used to actuate the assembly 46 of FIGURE 14 to engage the clutch 44.

In FIGURE 19 is shown the apparatus for driving the choppers in the analog-digital hold circuit. The pickup 48 (FIGURE 14) supplies signals through the unit 27 (FIGURE 21) to a terminal 210 where it is then applied to the input of a monostable multivibrator 211. Positive potential is also supplied across resistor 212 to this same input. The monostable multivibrator is described in "Wave Forms" on pages 167 to 168 and shown in FIGURE 5.10 therein. This apparatus is used to provide a pulse having a square shape and a definite time period in response to an input trigger. Positive potential is supplied to it through the leads 212 and 214, while negative potential is supplied to the output signal across the resistor 216. The output signal appears on the potentiometer 217 where it is picked off and applied to grid of a triode 218 (which is a cathode follower and could well be a double triode) after passing through a resistor 219. The output signal is applied across resistor 220 to the output terminal 221. In order to provide 60 cycle current while adjusting the various circuits, a normally open switch 222 is provided which is connected by a transformer 223 to 60 cycle line current supplied from source 224.

The chopper operating circuit for the digital to analog apparatus of FIGURE 17 is shown in FIGURE 20. Again, the pickup 49 in unit 27 supplies pulses to a terminal 226 which is the input of bistable multivibrator 228. This multivibrator is constructed like that shown in "Wave Forms" on page 164 and has no modifications as does the similar circuit of 202. The terminal 226 is also connected to a source of positive potential by a resistor 230 and to ground through a resistor 231. Positive potential is also applied across a potentiometer 232 connected to the output of 228. The contactor for 232 is connected across a resistor 233 to a cathode follower 234. This could be a double as well as a single triode. The output from cathode follower 234 appears at terminal 158 (FIGURE 17) where it is then applied to the hold circuit chopper solenoids. The signal appearing at this terminal is of a square wave time relationship. The cathode of 234 is biased by a connection to negative potential through resistor 236.

In FIGURE 21 there is shown the unit 27 which is common to FIGURES 18 through 20. This unit is for picking up the signals from the timing generator of FIGURE 14 and applying it to an oscillator circuit for converting it to timed electric pulses. This is done by electro magnetic pickup coils 47, 48 or 49 as the case may be. These in turn apply their signal through leads 240 and 241 to the grid and cathode respectively of a pentode 242. These leads are shielded and grounded. A capacitor 243 connects lead 240 to ground and parallel connected capacitor 244 and resistor 246 are interposed in 240 btween the grid and the pickup element 47. The suppressor grid of the pentode is connected to the ground.

The screen grid is connected to a source of positive potential through a resistor 247 and grounded to capacitor 248. The output from the pentode is applied to the tuning circuit that comprises capacitors 248 and 249 connected in parallel with their respective coils 251 and 252. The coils are actually part of slug tuning apparatus to enable tuning the oscillator of which pentode 242 is part. Resistors 253 and 247 supply +300 volts plate potential from a common supply to the plate and screen circuits of the tube 242. A grounded capacitor 254 and a capacitor in series with the tuning unit complete the circuit and supply the output signal thereof to the terminal 190, 210 or 226, according to which of the circuits of FIGURES 18 through 20 are connected thereto.

FIGURE 7 shows the biasing means for adjusting respective "yes-no" circuits in the analog to digital convertor. Here, terminals C, D . . . J represent, respectively, the 1, 2 . . . 128 circuits. As shown on the drawing, the respective potentiometers are adjusted so that the circuit fires, i.e., says yes, and applies a signal to the And circuit 24 whenever their respective firing voltage is applied thereto. As previously explained, if 50 volts or more is applied to the 128 circuit, it fires and, thus, prepares the punch mechanism for operating and, similarly, each of the other circuits will react upon a certain signal being applied thereto. In the embodiment shown, each circuit has firing voltages that are ½ that of the preceding circuit.

In describing the operation of this apparatus, let us assume that the punching machine has a punching speed of twenty punches/second. Due to the physical spacing of the tape puncher and tape reader, there is a certain minimum time which the system can store and below that it cannot store. In other words, all times or delays must be greater than this amount. In an actual embodiment, this minimum time was approximately two seconds for a 20 punch per second machine. Let us assume that it is desired to delay the analog signal for 180 seconds; in such case, the delay circuit counter 208 (FIGURE 18) is manually set according to the following formula:

$$N=\left[\text{desired delay (second)}\times\frac{\text{punch rate (here 20)}}{2}\right]-\text{preset (here, }2\times 20)$$

Once this is set, then all that is necessary to do is to apply the analog signal to the input terminals of system shown in FIGURE 1 and it will produce an analog with a desired amount of time delay.

By way of example, it is assumed that it is desired to introduce a 180 second delay into the analog signal such as a sine wave of FIGURE 4. The delay counter is assumed to have been properly set. The analog signal is applied to terminal 50 of FIGURE 15 where it is inverted with a gain of .5, the D.C. level is offset plus 50 volts, and is then applied through contacts 60*a* and 68*a* to charge the condenser 66. The condenser continues to charge until the choppers 60 and 68 are moved against their respective contacts 60*b* and 68*b*. This movement takes place when one of three notches in timing wheel 40 goes by its pickup 48 and, thus triggers the monostable multivibrator 211 to provide a square wave with a predetermined duty cycle. This permits one complete cycle of chopper switching for each trigger from pickup 48. When the choppers contact with their *b* terminals, the signal is transferred from condenser 66 to condenser 62. This condition is maintained until the next notch in the wheel 40 goes by the pickup 48 and returns the choppers to their initial position to again charge condenser 66. When the choppers do return to their initial position (against the contacts 60*a* and 68*a*) the condenser 62 continues to apply a signal to the terminal of amplifier 64. The result is that a stairstep signal will appear at terminal 75. This signal will have the appearance of that shown in FIGURE 5. The signal is always stair-stepped and is always positive in polarity. Thus, it is seen that the capacitor 62 operates as a short term memory circuit to maintain the horizontal portions of the stairs in FIGURE 5 when the contacts of the choppers are against the A terminals.

Once the stair-step is obtained, the next problem is to break it down into bits so that it can be applied to the punching mechanism and to the tape. This is accomplished by the apparatus of FIGURE 16. It must be remembered that one of the circuits of FIGURE 16 is provided for each channel that is desired to punch on the tape. In one preferred embodiment, 8 channels were used, therefore, 8 of the circuits shown in FIGURE 16 were provided. Those known as "yes-no" were connected in series one with the other, while those known as And circuits were connected individually to their respective "yes-no" circuits. The purpose of the "yes-no" circuit is to aid in breaking the stair-step into bits, while the purpose of the "And" circuit is to cause all channels which have answered yes to be prepared for punching simultaneously. Mechanical means, no part of this invention, and available on commercial units, perform the actual punching after thus being prepared. By way of example, the operation of the 128 circuit will be discussed. It is to be noted that the other circuits will operate in a similar manner, except for the firing voltages required.

In any event, the stair-stepped signal appears at terminal 75 and is applied to the unit gain phase inverting amplifier 21. Since the signal at 75 is always positive, the signal at junction 84 (the output of 21) will always be negative. The voltage at point J has previously been adjusted to cause voltage regulators 98 to fire and 93 to extinguish when a signal greater than −50 volts appears at junction 84. This action is caused by the negative potential at 84 reducing the plate current in the triode 90. The grid voltage of triode 92 then rises, causing plate current to flow in 92, thus creating an increased voltage drop across resistor 109. This reduces the current through voltage regulator 93 causing it to extinguish. The plate current in 96 is thereby cut off and voltage regulator 98 fires, developing a precise voltage across the voltage divider comprising 99, 100 and 101. Feedback from the voltage regulator 98 to the grid of triode 92 provides a multivibrator action to hold triode 92 at zero bias (maximum plate current) once the regulator 98 has fired.

Under the above conditions of a +50 volt input signal appearing at 75, the voltage at the arm of resistor 100 is adjusted so that zero output signal results from the output from the unity gain summing amplifier 22. The output of voltage regulator 98 coupled through cathode follower 107 is used to enable the code magnetic keyer circuit. A subsequent punch pulse received from the recording pulse generator 26, FIGURE 2, fires the circuit 24 and thus causes a punch to be actuated. As previously explained, the punching action is not accomplished until all circuits, 128 through 1, have operated on the signal applied to terminal 75.

The foregoing description assumes that the stair-step is equal to or greater than 50 volts. If this is not so, the unity gain amplifier 21 will reverse polarity of the signal from plus to minus and since the "yes-no" circuit 23 will not be actuated, the summing amplifier 22 will again reverse polarity of this signal and since it is unity gain will provide the same signal at the original polarity to the next "yes-no" circuit, e.g., the 64 circuit which is biased to answer yes at 25 volts or more. These processes are carried on in each "yes-no" circuit until the signal is reduced to zero or to an amount below the minimum signal voltage which is 0.391 volt in one preferred embodiment.

Now assume that one stair-step has been completely read by all 8 channels and respective ones of the And circuits 24 are prepared and awaiting the punch pulse from 27. As will be noted in FIGURE 14, the timing wheel 39 has only one notch, therefore, these punch pulses will only be supplied one time for every three of the stair steps actually processed by the "yes-no" circuit 23. In any event, the pickup 47 will determine when the punch pulse is to be generated, and the circuit of FIGURE 18 will provide the requisite punch pulse at terminal 115. When this occurs, the circuit denoted as 24 in FIGURE 16 will fire and all punches then standing prepared by their respective circuits will be operated and punch their respective channels on the tape.

During this time, there has been no signal read out by the reader 16 and the digital to analog converter 17 of FIGURE 1. This is because the delay circuit 19 has not been actuated. The manner in which it is actuated is that the number of pulses equal to the delay time (assumed as 180 seconds) must be counted and stored before the clutch 44 of FIGURE 14 can be energized and, thus, actuate the hold circuit of the digital to analog converter 16. Assuming the 180 seconds has passed, this fact is determined by the delay circuit counter 208 of FIGURE 18 by counting the number of pulses applied thereto. When the requisite number has been applied, the counter will energize a clutch actuating solenoid and a timing wheel 45 of FIGURE 14 will begin supplying signals to the choppers in the hold circuit of FIGURE 17.

Another event also takes place at this time, viz, the clutch 44 will begin turning the tape moving mechanism which is part of the tape reader. When this occurs, the tape begins moving through the switches 140*a* through 140*h* of FIGURE 17. As each group of punches on the tape passes through these switches, they each will generate a pulse such as shown in FIGURE 8. This is achieved because the individual signals taken off the contactors of the switches 140 apply to the summing circuit shown in FIGURE 17 thence to the summing amplifier 146. The output signals provided by summing amplifier 146 are then applied to the chopper 153. Chopper 153 then alternatingly stores these signals in one of the two capacitors 154*a* or 154*b* while the chopper 155 is taking the signal out of the other capacitor 154*b* or 154*a*. This operation is done in order to convert the individual pulses of FIGURE 8 to a stair-stepped signal having the configuration of FIGURE 9. These stair-stepped summed signals are applied to the cathode follower 157 and from there are applied to the differential amplifier 164. A typical output signal from 164 is shown in FIGURE 11 and is applied to one terminal of the integrating circuit 34. The latter serves the purpose of generating a slope between the various stair-steps on the curve. This enables producing a signal closely resembling the original analog and having the desired time delay therein.

In one embodiment of the instant invention, all amplifiers were model K2W operational amplifiers as manufactured by the George A. Philbrick Researchers Incorporated, and as described in their catalog "Applications Manual for Philbrick Octal Plug-In Computing Amplifiers," copyright 1956, except for amplifiers 64 and 146 which were models K2X by the same manufacturer and described in said catalog. All amplifiers were phase reversing. The punching device used has been described above. The clutch mechanism 44 and the actuating device therefore except for the Veeder-Root counter were original equipment on this apparatus. The tape puncher was capable of operating at 20 punches per second, therefore, the timing wheel 39 was arranged for providing 20 punching pulses per second to the circuit number 24. This means that they "yes-no" circuit and the hold circuit 20 are operating at 60 cycles per second because of the fact the timing wheel 40 had three times as many notches in it as did the wheel 39. This also means that the digital to analog converter assembly 16 (FIGURE 1) read 20 times per second from the tape. If higher rates of punching and reading were desired, it would be necessary to employ machinery that is able to operate at higher punching rates. For example, a magnetic tape recording/playback system could be used to increase both recording and read-out rates by factors of at least ten.

In the actual embodiment, a circuit response speed of approximately 1 millisecond was obtained. By this is meant that all eight circuits of FIGURE 16 were able to decide on the magnitude of the signal and convert it to bits for application to the tape. It was necessary to provide a different speed between the hold circuit 20 and the punch keyer circuit 24 to decrease the error in transfer of charge from condenser 66 to condenser 62 when a square wave or step function comprises the input signal.

There is another limitation placed on a circuit by reason of its operating speed, that is, that it is limited in the speeds of the signals it can handle. Necessarily, a 60 cycle signal could not be very readily handled by the instant circuit with the latter operating at a 60 cycle rate on its signal voltage hold circuit. Nor would it be too satisfactory if a signal having a higher cyclic speed than the chopping speed of the instant circuit were to be treated. Increased chopper rates in the A–D converter hold circuit and D–A converter storage circuit will allow the present circuit to record, delay, and reproduce input signals of correspondingly higher frequency using a higher speed delay medium such as magnetic tape.

It is desired to operate the instant circuit at as high a speed as possible with reference to the cyclic rate of the input signal, e.g., example in FIGURE 13 with an input cyclic rate of 1 cycle per second the instant device gave almost perfect reproduction at a chopping rate of 60 c.p.s. and a punching and reading rate of 20 c.p.s. The fidelity of reproduction achieved by the overall system is dependent on the number of complete conversions which can be made during each cycle of the input voltage and the ratio of signal amplitude to the minimum voltage increment (.391 volt in this particular embodiment). It should be noted that step functions or square wave input signals are reproduced with very good fidelity. The only distortion introduced is in a finite rise time imposed by the maximum punch speed.

While as many channels as desired can be employed, there are limitations. As a practical matter, the maximum voltages the amplifiers can handle and the stability of the amplifiers and yes-no circuits limits the smallest voltage increment that can accurately be used.

It should now be evident that I have provided novel combination of apparatus, which in assembly can be used for introducing a dead time or a delay in an analog signal. It should be obvious that the instant apparatus is eminently suitable for converting from analog to digital form for use in other computer operations. Also, the instant invention includes means for converting from digital to analog. While I have explained my invention with respect to certain specific embodiments and examples, it is not my intention to limit myself in application to the examples nor to limit myself in practice to the exact combinations disclosed. I include as my invention not only those individual elements as shown but all modifications thereof which would be obvious to one skilled in the art.

I claim:

1. A process for continuously delaying a continuous electrical analog voltage signal for a predetermined time comprising, continuously receiving said electrical analog signal; generating a first series of timing signals; converting the thus received electrical analog voltage signal to a series of discrete signals responsive to said first series of timing signals; producing a group of signals representative of each of said discrete signals; generating a second series of timing signals; recording each said group of signals on a recording medium responsive to said second series of timing signals; producing a third series of timing signals; counting said third series of timing signals; reading each said group of signals from said recording medium upon the expiration of a preselected number of said third series of timing signals after the respective each said group of signals had been recorded on said recording medium, and converting the thus read group of signals to electrical analog voltage form.

2. In an instrument system wherein it is desired to introduce into a certain electrical analog voltage signal a time delay representative of that period of time between the initial measurement of a process stream for purposes of correcting a process variable and the next subsequent measurement of that part of the process stream which has been subjected to the corrected process variable, the improvement comprising continuously receiving said certain electrical analog voltage signal; generating a first series of timing signals; converting the thus received electrical analog voltage signal to a series of discrete signals responsive to said first series of timing signals; producing a group of signals representative of each of said discrete signals; generating a second series of timing signals; recording each said group of signals on a recording medium responsive to said second series of timing signals; reading each said group of signals from said recording medium upon the expiration of a period of time representative of said time delay after the respective each said group of signals had been recorded on said recording medium, and converting the thus read group of signals to electrical analog voltage form.

3. A process in accordance with claim 2 where the step of recording comprises piercing said recording medium.

4. Apparatus for introducing a delay time into an electrical analog voltage signal comprising an analog-to-digital converting means for converting the electrical analog voltage signal to a series of discrete signals; a tape puncher connected to said analog-to-digital converting means; a tape reader; means for storing tape connected between said tape puncher and said tape reader; a digital-to-analog converting means for converting the discrete signals to electrical analog voltage form; a timing signal pulse generator; first means connected between said timing signal pulse generator and said analog-to-digital converting means for applying a first series of pulses to said analog-to-digital converting means; second means connected between said timing signal pulse generator and said tape puncher for applying a second series of pulses to said tape puncher, said tape puncher being prepared for punching upon the coincidence thereat of one of said second series of pulses with a digital signal from the output of said analog-to-digital converting means; a time delay means; and third means connected from said timing signal pulse generator through said time delay means to said tape reader for actuating said tape reader to read said tape by producing digital signals responsive to the punched areas of the tape a preselected time delay after said punched areas are punched on said tape by said tape puncher; and means for passing the thus produced digital signals to the input of said digital-to-analog converting means.

5. Apparatus in accordance with claim 4 wherein said tape puncher and tape reader each comprise a multiple channel device, the individual channels of said tape puncher each being prepared for punching responsive to the coincidence thereat of a pulse from said second means and a signal from said analog-to-digital converting means; said second means providing said second series of pulses simultaneously to all channels of said tape puncher.

6. In an instrument system wherein it is desired to introduce into a certain electrical analog voltage signal a time delay representative of that period of time between the initial measurement of a process stream for purposes of correcting a process variable and the next subsequent measurement of that part of the process stream which has been subjected to the corrected process variable, the improvement comprising means for continuously receiving said certain analog voltage signal and for converting it to a series of discrete signals; means connected to said means for continuously receiving for applying a group of signals representative of each discrete signal to a recording means; means for reading each said group of signals from said recording means; means connected to and responsive to said means for reading for converting each group of signals to an electrical analog voltage form; means for generating timing signals, first means connected between said means for generating and said means for continuously receiving for applying a first series of timing signals to said means for continuously receiving; second means connected between said means for generating and said means for applying to apply a second series of timing signals to said means for applying, said means for applying being prepared for applying responsive to the coincidence thereat of one of said second series of timing signals with a signal from the output of said means for continuously receiving; third means connected between said means for generating and said means for reading to actuate said means for reading upon the expiration of a period of time representative of said time delay after said means for applying has applied a discrete signal to said recording medium.

7. Apparatus in accordance with claim 6 wherein said means for applying comprises a multiple channel tape puncher, wherein each channel represents a bit of the discrete signal, and wherein each channel is prepared for punching by the coincidence thereat of one of said second series of signals and a signal from said means for continuously receiving.

8. Apparatus in accordance with claim 6 wherein said means for generating comprises a synchronous motor; first and second shafts; first, second and third timing wheels; means for driving said first and second shafts from said motor and at respective predetermined angular velocities relative thereto; said first and second timing wheels being mounted on said first shaft; said third timing wheel being mounted on said second shaft; and means for providing power from said motor to said means for applying and said means for reading; and each of said first, second, and third means further comprises a pickup disposed adjacent one of said timing wheels.

References Cited in the file of this patent

UNITED STATES PATENTS

| | | |
|---|---|---|
| 2,391,246 | Kenney | Dec. 18, 1945 |
| 2,431,646 | Kenney | Nov. 25, 1947 |
| 2,435,879 | Eilenberger | Feb. 10, 1948 |
| 2,513,683 | Shaper et al. | July 4, 1950 |
| 2,614,632 | Clos | Oct. 21, 1952 |
| 2,731,631 | Spaulding | Jan. 17, 1956 |
| 2,765,405 | Gamarekian | Oct. 2, 1956 |
| 2,804,499 | Butts | Aug. 27, 1957 |
| 2,852,764 | Frothingham | Sept. 16, 1958 |